Sept. 15, 1970     H. KUMPF     3,528,885
FUEL ELEMENT FOR NUCLEAR REACTORS
Original Filed May 17, 1966
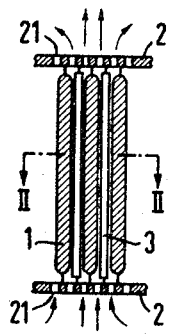
Fig.1
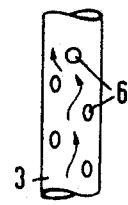
Fig.7
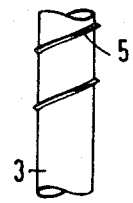
Fig.4
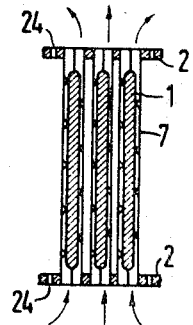
Fig.5
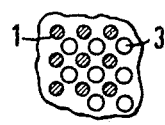
Fig.2    Fig.3
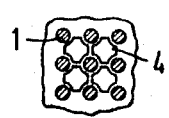
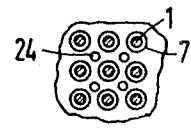
Fig.6
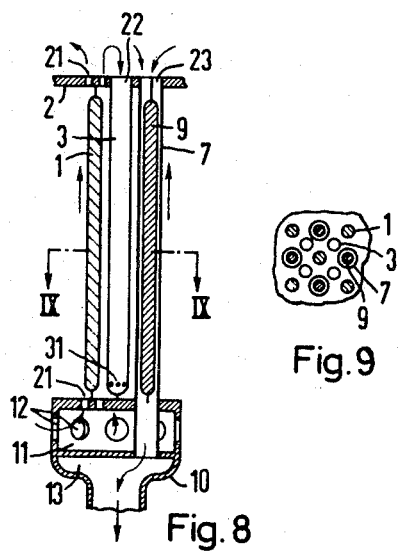
Fig.8    Fig.9
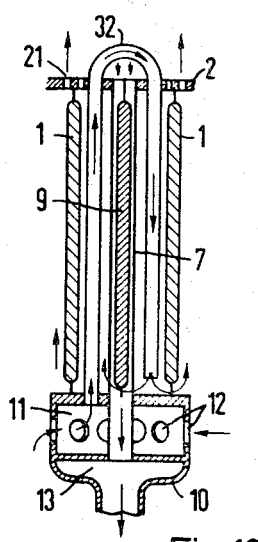
Fig.10

United States Patent Office 3,528,885
Patented Sept. 15, 1970

3,528,885
FUEL ELEMENT FOR NUCLEAR REACTORS
Hermann Kumpf, Erlangen, Germany, assignor to Siemens Aktiengesellschaft, Erlangen, Germany, a corporation of Germany
Continuation of application Ser. No. 550,812, May 17, 1966. This application Dec. 11, 1967, Ser. No. 689,729
Claims priority, application Germany, May 19, 1965, S 97,170
Int. Cl. G21c 3/32
U.S. Cl. 176—78          9 Claims

ABSTRACT OF THE DISCLOSURE

Nuclear fuel element for water-cooled reactors having a supercritical pressure zone includes a plurality of fuel rods located spaced from and substantially parallel to one another, a plurality of tubular inserts located intermediate the fuel rods and formed, on a side thereof facing toward the fuel rods, with flow-guiding and vortex-producing means for a fluid coolant traversing the fuel element. The flow-guiding means serve simultaneously for spacing the fuel rods relative to each other, and the inserts are of such construction that the coolant on the side of the inserts facing away from the fuel rods is of average lower temperature than the coolant on the side of the inserts facing toward the fuel rods. Also provided are means for distributing the coolant which are located at only one end of the fuel element and are formed with means for supplying the coolant to the fuel element and for discharging the coolant therefrom.

My invention relates to fuel elements for nuclear reactors, and more particularly to fuel elements for water-cooled reactors having a supercritical pressure zone.

It is an object of my invention to provide a nuclear fuel element which permits the simplest possible interior construction of the nuclear reactor.

It is a further object of my invention to provide a fuel element which will permit the reactor to have a minimum number of zones separated by partitions since they hinder the exchanging or replacement of the fuel elements.

It is also an object of my invention to provide a fuel element which will permit the best possible exchange of coolant between the individual fuel elements and within the individual fuel elements, i.e. between the individual fuel rods.

It is yet another object of my invention to provide a fuel element which will permit only the smallest possible portion of the water located in the nuclear reactor to be at a high temperature and which will affect the flow velocity of the coolant in the vicinity of the fuel rods so that it is not dependent only upon the nuclear geometry.

With the foregoing and other objects in view, I provide, in accordance with the invention, tubular inserts between the individual fuel rods of the fuel element. On the sides of the tubular inserts facing the fuel rods I provide flow-guiding and vortex-producing devices which serve simultaneously for centering the fuel rods and, on the sides of the tubular inserts facing away from the fuel rods, the coolant is on an average at a lower temperature than on the side facing the fuel rods. The necessary coolant distribution devices are accordingly normally located on only one side of the fuel element.

In accordance with other features of my invention the tubular inserts are located between the individual fuel rods or concentrically surround them. On the sides of the insets facing the fuel rods, there are provided flow-guiding and vortex-producing devices, for example in the shape of bosses, fins and the like. In this manner, the coolant water prescribes a defined path in the vicinity of the fuel rods so that at that location a rapid and uniform heating of the water occurs in a desired manner. In the adjacent spaces, however, which do not contain any fuel rods, the coolant is kept at an essentially lower temperature than in the channels along the fuel rods so that its moderating characteristics are maintained there to a great degree. This is achieved by a suitable control or regulation of the coolant flow resulting from the proper dimensioning of the tubular inserts and/or also by the development or construction of the coolant distribution devices located only on the one side of the fuel element.

Other features which are considered as characteristics for the invention are set forth in the appended claims.

Although the invention is illustrated and described herein as embodied in fuel element for nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic longitudinal view of a fuel element constructed in accordance with the invention;

FIGS. 2 and 3 are cross-sectional views of two different embodiments of the fuel element shown in FIG. 1;

FIG. 4 is a modified longitudinal view of a fragment of the insert shown in the fuel element of FIG. 1;

FIG. 5 is a diagrammatic longitudinal view of another embodiment of the invention;

FIG. 6 is a cross-sectional view of FIG. 5;

FIG. 7 is a modified longitudinal view of a fragment of the insert of FIG. 4;

FIGS. 8 and 9 are respective diagrammatic longitudinal and cross-sectional views of yet another embodiment of the fuel element of the instant invention; and FIG. 10 is a diagrammatic longitudinal view of still another embodiment of the fuel element constructed in accordance with the invention.

Referring now to the drawings and first particularly to FIGS. 1 to 3 thereof, there are shown fuel elements in schematic form which are provided with tubular inserts 3 (FIG. 2) and 4 (FIG. 3) located between the fuel rods 1. The inserts, depending upon the spacing relationships between the fuel rods 1, have a circular cross section according to the embodiment of FIG. 2 and a substantially clover leaf cross section 4, such as is shown in FIG. 3. The fuel rods 1 as well as the tubular inserts 3 and 4 are mounted in a conventional manner well known in the art between the end plates 2 (FIG. 1) of the fuel element. The end plates 2 are provided with bores 21 for passage of a fluid coolant. The flow velocity at the surface of the fuel rods 1 is increased due to the tubular inserts 3 or 4 and the heat exchange is additionally increased, for example by providing helical bulges or ridges 5 (FIG. 4) on the tubular inserts 2 or by providing knobs or studs 6 extending from the surface of the tubular inserts 3 as shown in FIG. 7 which space the fuel rods from one another.

The tubular inserts 3 or 4 are provided at both ends thereof with small holes so that in the interior thereof a slight flow of the coolant, inherently acting as a moderator, can be maintained. There is thus assurance that the fluid within the inserts will always be at a lower temperature than outside the same.

As shown in FIG. 5, the tubular insert 7 can also concentrically surround the fuel rods of the fuel element, in which case threaded ridges such as shown in FIG. 4 or knobs 6, such as are shown in FIG. 7 can extend inwardly and, in addition to their flow-guiding functions, can simultaneously serve for centering the fuels rods 1. In the embodiment of FIG. 5, the tubular inserts 7 are inserted in suitable bores of the end plates 2. This construction is particularly suitable for superheater fuel elements wherein it is advantageous to construct the tubular inserts 7, for example with double walls or to heat-insulate them by any known manner. Thus, the tubes 7 which, like the tubes 3, consist for example of zinc alloy or a stainless steel, can be in the form of a double wall, with an insulating air or vacuum space therebetween, or can be covered with a suitable heat-insulating material. By means of additional bores 24 in the cover plates 2 or at both ends of the tubular inserts 7, a slight flow of coolant is maintained thereto on the outside of the inserts and thereby a lower coolant temperature is afforded at those locations.

For the fuel element shapes described and illustrated in FIGS. 1 to 7, there is provided a coolant flow direction only from a lower location to an upper location, that is the coolant supply is located in the lower portion of the reactor pressure vessel and discharge of the coolant is effected in the upper portion thereof. Fuel element shapes or forms other than those illustrated in FIGS. 1 to 7 are possible, however, whereby two flow directions of the coolant can be provided.

Examples of the latter type of fuel element constructions are shown in FIGS. 8 to 10. In FIGS. 8 to 10, use is made of both principles of insertion, namely with the tubular inserts 3 and 7. The coolant flows from bottom to top of the fuel rods 1 (FIGS. 1 to 7) whereas it flows from top to bottom of the special superheater rods 9 (FIGS. 8 to 10). The latter rods 9 are surrounded by the suitably insulated tubes 7, discussed heretofore with regard to the embodiment shown in FIG. 5, whereas tubular inserts 3 are located between the other fuel rods 1. The inserts 3 are provided at one end with bores 31 as coolant inlets and are inserted at the upper open end thereof, as seen in FIG. 8, in suitable bores 22 formed in the end cover plate 2. The insulated tubes 7 are secured in bores 23 of this cover plate 2.

The fuel element shown in FIG. 8 does not carry any special structures at its upper end; however, coolant-distributing means including a coolant guide chamber 10 is provided at its lower end. The guide chamber 10 is divided into two spaces 11 and 13, the space 11 being provided with lateral bores 12 through which the coolant is received in the space 11 and supplied therefrom to the fuel element rods through the bores 21. The tubular inserts 7 encasing the superheater rods 9 communicate with the space 13. The fuel element of FIGS. 8 and 9 can then, for example, be placed on a horizontal partition so that the openings 23 of the tubular inserts 7 are aligned with suitable bores in the lower portion of the reactor pressure vessel whereby the cold coolant can be supplied at the top of the fuel element and can be discharged at the lower end thereof. By providing the chamber member 10 with a suitable shape relatively easy interchangeability of the combined fuel elements can be realized.

Virtually the same characteristics discussed above with regard to the embodiment of FIGS. 8 and 9 can be repeated for the embodiment of FIG. 10, with the exception that the cold coolant is not supplied to the fuel element through the bores 21 of the end plate 2 but rather through a U-shaped tubular insert 32 having a wall construction similar to that of the tubular insert 7. The U-shaped tube 32 is inserted at one end thereof into the lower cover plate 2 and communicates at the other end thereof above this cover plate with the space in which the fuel rods are located. In this manner, the coolant first flows entirely through these tubular inserts 32, which can consist of the same material as the inserts 7, and only thereafter circulates around the fuel element. In the upper cover plate 2, of the embodiment of FIG. 10, the bores 21 are provided as in the embodiment of FIGS. 1 and 8, through which the heated coolant can discharge and subsequently pass through the superheater fuel rods 9 or through the inserts 7 surrounding them, in a downward direction to the chamber 13. Also in the case of the embodiment of FIG. 10, suitable coolant structures such as the vortex-producing device of FIGS. 4 and 7 can be provided so that the best possible heat transfer between the fuel rods and the coolant can be obtained.

For all the embodiments of the fuel elements, a free flow discharge of the coolant is effected through the upper cover plate so that the coolant can mix above the fuel elements and thereby automatically produce a temperature balance or equalization between fuel elements of different spacial arrangement in the reactor core. It is obvious that fuel elements of this type, which are shown here only schematically, i.e. without an outer casing or the like, can be inserted without any particular difficulty in the reactor core and can also again be withdrawn therefrom. The insertion of control rods into the reactor core is also particularly simple with these fuel elements. The control rods can, for example, be meshed or inserted in the tubular inserts 3, if the latter are constructed as shown in FIG. 8. Such an arrangement of the inserts 3 is naturally also able to be effected readily in the embodiment of FIG. 1. Control rods which can be inserted in such thin tubular inserts are referred to in reactor technology as finger control rods. Naturally, other larger control rods can be inserted between the individual fuel elements in any manner suitably known to the man of ordinary skill in the art, since this part of the construction of the reactor core can be effected independently from the construction of the individual fuel elements and consequently does not form an essential part of the invention of the instant application.

Nuclear reactors with fuel elements constructed in accordance with the invention of the instant application naturally permit manifold variation in the construction thereof, and are particularly suited for operation with supercritical water as coolant and moderator medium. Furthermore, it is also possible to control the reactor by suitably regulating the coolant temperature or the flow velocity of the coolant within the tubular inserts or in the spaces of the fuel element separated from the fuel rods.

I claim:

1. Nuclear fuel element for water-cooled reactors having a supercritical pressure zone comprising a plurality of fuel rods located spaced from and substantially parallel to one another, a plurality of tubular inserts having a wall located intermediate said fuel rods, end holding means for holding said fuel rods and said inserts at the ends thereof, said wall of said tubular inserts having a side facing toward at least one of said fuel rods and a side facing away from said one fuel rod, said side facing toward said one fuel rod being formed with flow-guiding and vortex-producing means for a fluid coolant traversing the fuel element in engagement with said one fuel rod on said side facing toward said one fuel rod, said flow-guiding and vortex-producing means serving simultaneously for spacing said fuel rods relative to each other, said inserts being formed with openings at both ends thereof and said end holding means having bore means communicating with the end openings of said inserts for conducting the coolant along both sides of said wall whereby the coolant on the wall side of said inserts facing away from said one fuel rod is of average lower temperature than the coolant on the wall side of said inserts facing toward said one fuel rod.

2. Nuclear fuel element according to claim 1, including means for distributing the coolant, said coolant-distributing means being located at only one end of the fuel element.

3. Nuclear fuel element according to claim 2, wherein said coolant-distributing means is formed with means for supplying the coolant to the fuel element and for discharging the coolant therefrom.

4. Nuclear fuel element according to claim 1, wherein said tubular inserts surround at least one of said fuel rods with slight clearance therebetween.

5. Nuclear fuel element according to claim 1, wherein at least one of said tubular inserts is traversed by the coolant before the coolant comes into engagement with said fuel rods.

6. Nuclear fuel element according to claim 1, wherein said tubular inserts are formed with spaced double walls.

7. Nuclear fuel element according to claim 1, wherein said tubular inserts are formed of metal having an insulating coating.

8. Nuclear fuel element according to claim 1, wherein said flow-guiding and vortex-producing means comprises a substantially helical ridge formed on at least one of said tubular inserts.

9. Nuclear fuel element according to claim 1, wherein said flow-guiding and vortex-producing means comprises a plurality of knobs formed on at least one of said tubular inserts.

References Cited
UNITED STATES PATENTS

| | | |
|---|---|---|
| 3,182,003 | 5/1965 | Thorp et al. |
| 3,212,991 | 10/1965 | Brynsvold et al. |
| 3,301,764 | 1/1967 | Timbs et al. |
| 3,301,765 | 1/1967 | Eyre et al. |
| 3,344,855 | 10/1967 | Clark. |

REUBEN EPSTEIN, Primary Examiner

U.S. Cl. X.R.

176—59, 61, 76